United States Patent
Lounsbury

(10) Patent No.: US 6,473,926 B2
(45) Date of Patent: Nov. 5, 2002

(54) CROSS TRAFFIC LEGS FOR DOCK LEVELER

(75) Inventor: Mark S. Lounsbury, Wassaic, NY (US)

(73) Assignee: Overhead Door Corporation, Dallas, TX (US)

( * ) Notice: Subject to any disclaimer, the term of this patent is extended or adjusted under 35 U.S.C. 154(b) by 0 days.

(21) Appl. No.: 09/759,623

(22) Filed: Jan. 12, 2001

(65) Prior Publication Data

US 2002/0092102 A1 Jul. 18, 2002

(51) Int. Cl.$^7$ ................................. E01D 1/00
(52) U.S. Cl. ......................... 14/71.1; 14/69.5
(58) Field of Search ................ 14/69.5, 71.1, 14/71.3

(56) References Cited

U.S. PATENT DOCUMENTS

| | | | |
|---|---|---|---|
| 3,902,213 A | * | 9/1975 | Pfleger et al. ............... 14/71.3 |
| 3,921,241 A | * | 11/1975 | Smith ......................... 14/71.3 |
| 4,328,602 A | | 5/1982 | Bennett |
| 4,619,008 A | | 10/1986 | Kovach et al. |
| 4,974,276 A | | 12/1990 | Alexander |
| 5,440,772 A | | 8/1995 | Springer et al. |
| 5,586,356 A | | 12/1996 | Alexander |
| 5,813,072 A | | 9/1998 | Alexander |

\* cited by examiner

Primary Examiner—Gary S. Hartmann
(74) Attorney, Agent, or Firm—Gardere Wynne Sewell LLP

(57) ABSTRACT

Cross traffic legs for a dock leveler having a ramp mounted for pivotal movement between inclined, declined and cross traffic positions include first leg members mounted for pivotal movement on the ramp and second leg members which are supported on and moveable with respect to the first leg members to allow positioning the ramp in a below dock position. Leg lock members are supported for pivotal movement on the first leg members between working positions engageable with the second leg members to support the ramp in a cross traffic position and retracted positions out of engagement with the second leg members to allow the dock leveler ramp to move to a below dock position. The leg lock members are connected to an extension lip pivotally mounted on the ramp so that, as the lip is extended, the lock members are moved out of engagement with the cross traffic legs. A lock pin is engageable with one of the lock members to prevent unwanted lifting of the lip when the ramp is in a stored, cross traffic position.

19 Claims, 4 Drawing Sheets

CROSS TRAFFIC LEGS FOR DOCK LEVELER

FIELD OF THE INVENTION

The present invention pertains to a dock leveler and cross traffic leg mechanisms for supporting a dock leveler, in particular.

BACKGROUND

In the art of dock levelers and related devices a conventional configuration includes a ramp which is mounted in a pit at the edge of a freight dock for pivotal movement to provide a support surface between the dock and the loadbed of a vehicle to facilitate loading and unloading of the vehicle. Because of the various heights of vehicle loadbeds which may be parked at a loading dock, dock levelers should be adapted to move between a position wherein the dock leveler ramp extends above the surface of the dock and also to a position where the ramp may extend below the generally horizontal dock surface to provide a support for vehicle loadbeds which are, in themselves, at an elevation above or below the dock surface. Dock levelers should also be capable of being supported in a position wherein the ramp is substantially coplanar with the dock surface to permit traffic across the ramp when the dock leveler is inactive, for example.

In order to provide support for the dock leveler ramp in the so-called cross traffic or stored position of dock leveler, so-called cross traffic legs have been developed which are intended to support the ramp, generally at the end of the ramp opposite the end which is connected for pivotal movement with respect to the dock. Examples of prior art cross traffic leg arrangements are disclosed in U.S. Pat. No. 3,902,213 and 4,279,050.

However, there has been a continuing need to provide improved cross traffic legs for dock levelers which provide support for the dock leveler ramp to be substantially coplanar with the dock surface in the stored position of the ramp to permit so called cross traffic and also to allow for movement of the ramp to working positions inclined above the dock surface and declined below the dock surface. These desiderata have been sought with prior art cross traffic leg mechanisms which are either somewhat complicated, unreliable or difficult to manufacture. It is to overcome the deficiencies of prior art dock leveler cross traffic leg configurations and to provide improvements in such mechanisms that the present invention has been developed.

SUMMARY OF THE INVENTION

The present invention provides an improved cross traffic leg mechanism for a dock leveler.

In accordance with one aspect of the present invention, a dock leveler is provided with cross traffic legs which include telescoping leg members which are mounted for pivotal movement on the distal end of a dock leveler ramp to accommodate various inclined and declined positions of the ramp with respect to the dock surface, for supporting the ramp in the cross traffic position and for supporting the ramp if the ramp suddenly declines from an elevated position or selected below dock level positions In accordance with another aspect of the present invention, cross traffic legs for a dock leveler are provided which include moveable lock members, respectively, which move in conjunction with movement of a pivotable ramp extension lip member. The leg lock members move between (1) a working position to lock the cross traffic legs in a predetermined position when the lip is in a pendant position and (2) a retracted position to unlock the cross traffic legs for floating or telescoping movement when the lip is in a working or extended position with respect to the leveler ramp. Moreover, when the ramp is being moved between a generally horizontal stored position and a declined or below dock position the cross traffic legs are operable to accommodate such movement.

In accordance with another aspect of the present invention, a cross traffic leg arrangement for a dock leveler is provided wherein, in the stored position of the dock leveler ramp, the cross traffic legs are locked so that the ramp extension lip and the ramp cannot be raised from the exterior of the loading dock to gain access to the interior of a building at which the dock leveler is disposed.

In accordance with still another aspect of the invention, a dock leveler ramp is provided with two spaced apart cross traffic support legs which are characterized by somewhat tubular leg members mounted for limited pivotal movement on the underside of the ramp, include telescoping leg members mounted thereon for limited movement and further include leg lock members which may be moved from a position to lock the telescoping leg members in extended positions to support the ramp in the ramp cross traffic position and positions of the lock members which permit telescoping movement of the leg members to allow the dock leveler ramp to move to selected below dock working positions.

Those skilled in the art will further appreciate the advantages and superior features of the invention upon reading the detailed description which follows in conjunction with the drawings.

DETAILED DESCRIPTION OF A PREFERRED EMBODIMENT

Figure 1:
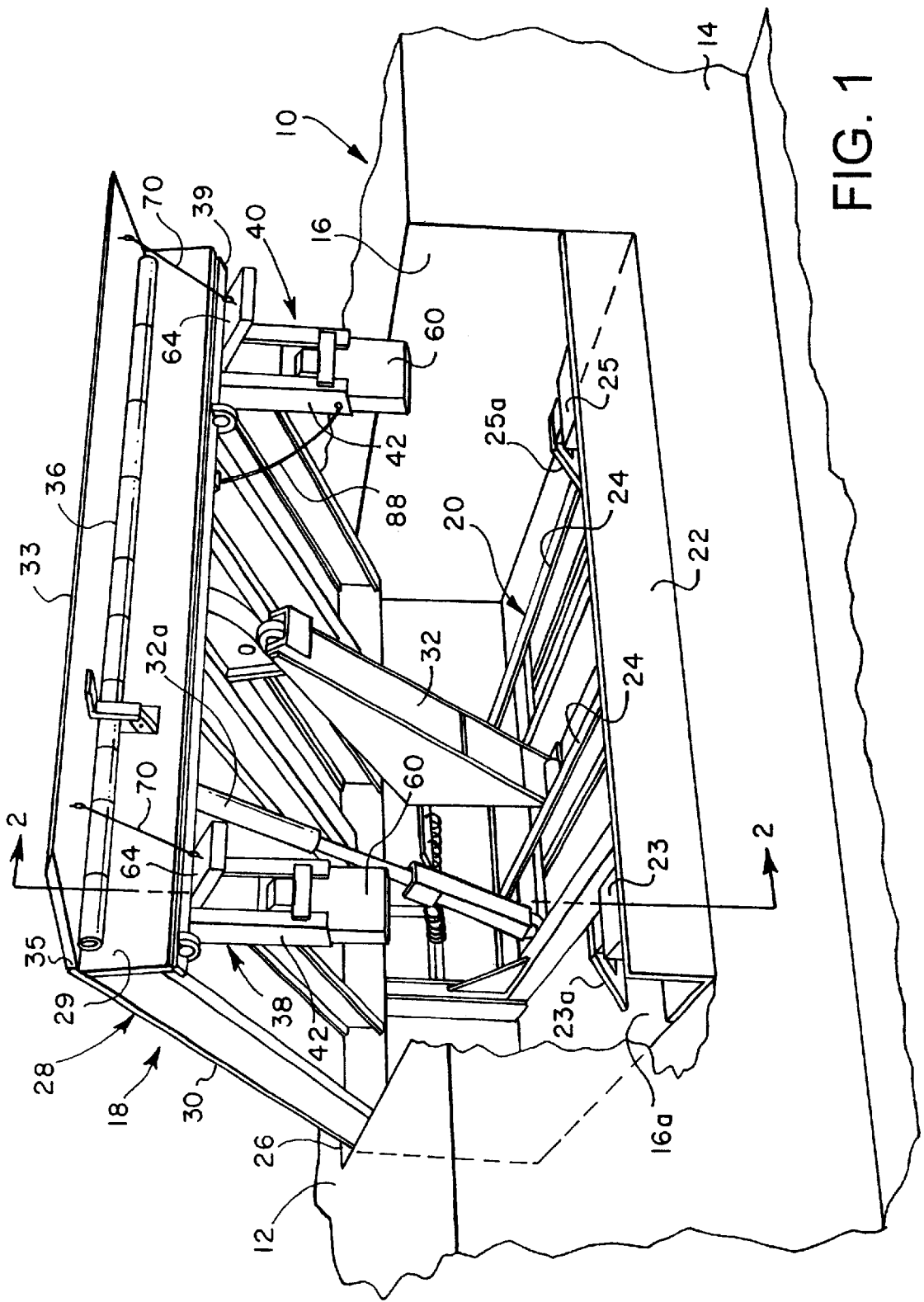
FIG. 1 is a perspective view of a dock leveler mounted at a loading dock and including the improved cross traffic legs of the present invention.

In the description which follows like parts are marked throughout the specification and drawing with the same reference numerals, respectively. The drawing figures may not be to scale in the interest of clarity of illustration.

Figure 2:
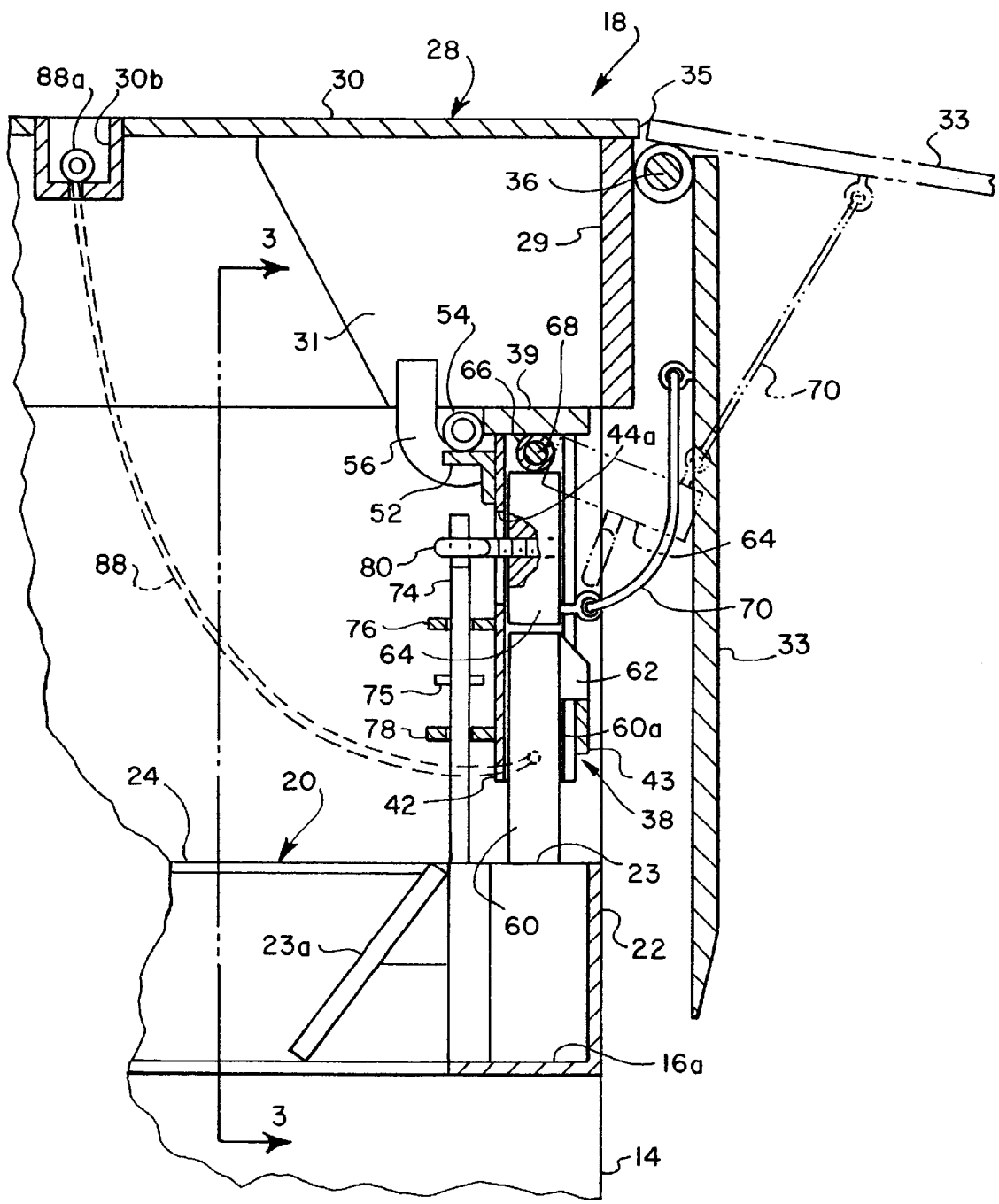
FIG. 2 is a view taken generally from the line 2—2 of FIG. 1 with the dock leveler ramp in the stored and cross traffic position.

Referring to FIG. 1, there is illustrated a loading dock for a warehouse or similar facility, which loading dock is generally designated by the numeral 10. The loading dock 10 includes a generally horizontal dock surface 12, a front wall 14 and a generally rectangular recess or pit 16 formed therein, as shown. A dock leveler 18 is shown disposed in the pit 16 and is characterized by a frame 20 having a generally right angle shaped transverse front frame member 22 connected to longitudinal frame members 24 which are operably connected to a rear transverse frame member 26. Frame member 26 is suitably connected to a ramp 28 having a generally planar deck 30. Ramp 28 is moveable by suitable elevating mechanism 32 between a substantially horizontal stored position, as shown in FIG. 2, and an elevated working position as shown in FIG. 1. A suitable ramp holddown mechanism 32a, FIG. 1, is interconnected between ramp 28 and frame 20. Holddown mechanism 32a may be of a type disclosed and claimed in U.S. Pat. No. 6,061,859 issued May 16, 2000 to Bruce R. Winter and assigned to the assignee of the present invention.

A ramp extension lip 33 is hinged to the distal edge 35 of the ramp 28 by a suitable hinge 36 and is connected to suitable mechanism, not shown, for movement from a pendant position, as shown in FIG. 2, to an elevated or extended position as shown in FIGS. 1 and 2, when the ramp is moved to a working position. The normal stored position of the ramp 28 and the lip 33 are illustrated by the solid lines in FIG. 2. Suitable mechanism for moving the lip 33 between the pendant position and the extended working position is not shown in the drawing figures but may be of a type described in U.S. Pat. No. 6,112,353 issued Sep. 5, 2000 to Bruce R. Winter and assigned to the assignee of the present invention, the disclosure of which patent and of U.S. Pat. No. 6,061,859 is incorporated herein by reference. In all events, when the dock leveler 18 is placed in operation and the ramp 28 is moved from a position where the deck 30 is substantially coplanar with the dock surface 12 to a working position, the lip 33 is moved from its pendant position shown by the solid lines in FIG. 2 to the extended position shown by the dashed lines in FIG. 2. Alternatively, when the ramp 28 is to be placed in its stored position with the deck 30 substantially coplanar with a dock surface 12 the lip 33 is allowed to decline to its pendant position.

Figure 3:
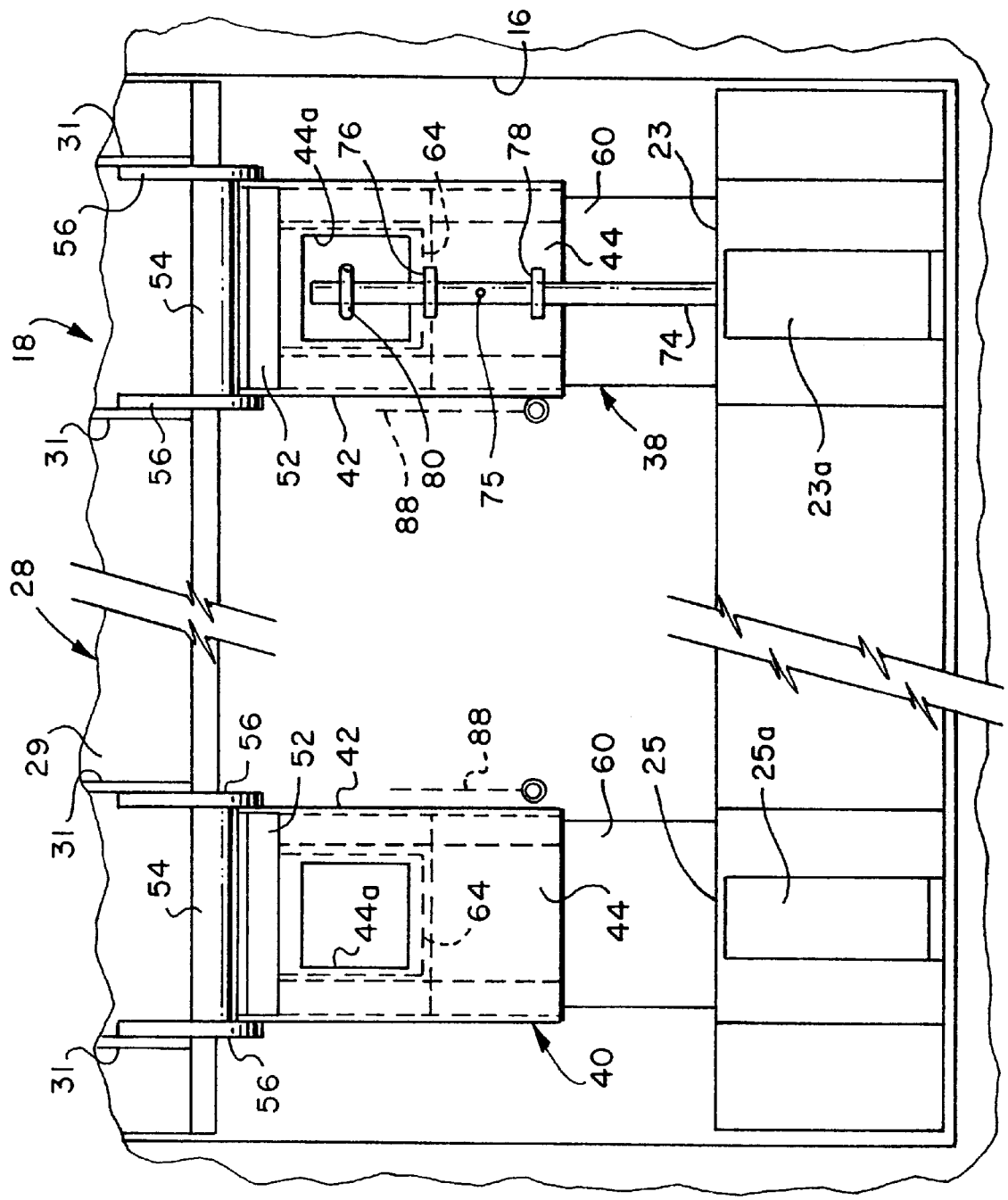
FIG. 3 is a view taken generally from the line 3—3 of FIG. 2.

Referring further to FIGS. 1, 2 and 3, the dock leveler 18 includes spaced apart cross traffic legs in accordance with the invention and generally designated by the numerals 38 and 40. The legs 38 and 40 are adapted for supporting the ramp 28 in a generally horizontal position with the deck 30 substantially coplanar with the dock surface 12 to permit so called cross traffic across the dock leveler 18 when it is not being utilized in conjunction with loading or unloading a vehicle. Each of the legs 38 and 40 is mounted for pivotal movement on the ramp 28 and each leg is supported by a transverse ramp frame member 39 which is substantially coextensive with frame member 29, see FIG. 2 also, which supports the hinge 36 for the lip 33. The cross traffic legs 38 and 40 are substantially identical with the exceptions noted herein.

Figure 4:
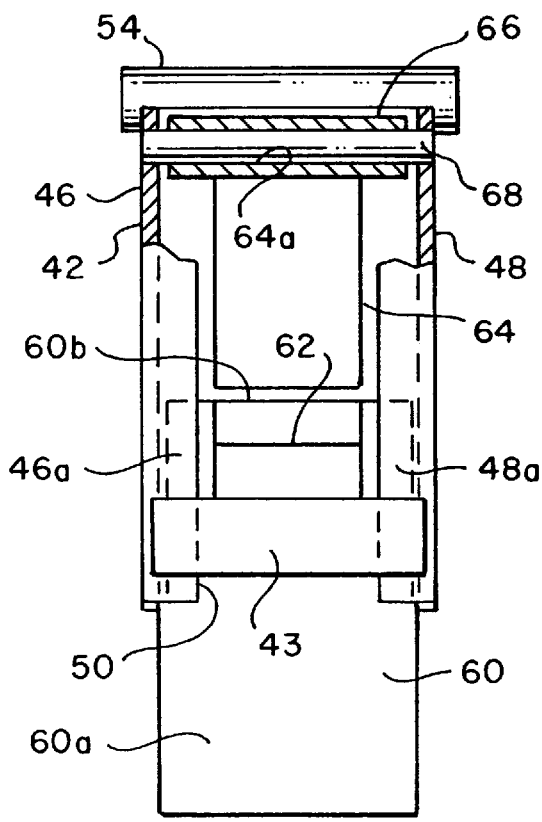
FIG. 4 is a front elevation of one of the cross traffic legs shown in FIGS. 1 through 3.
Figure 5:
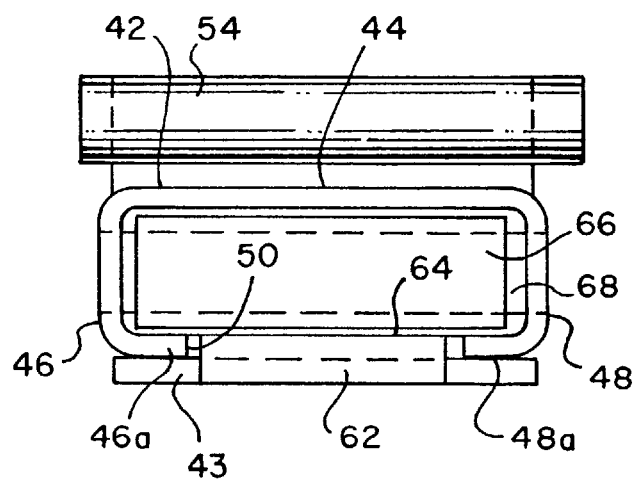
FIG. 5 is a top plan view of the cross traffic leg shown in FIG. 4.

Referring now primarily to FIGS. 2 through 5, each of the cross traffic legs 38 and 40 includes a somewhat channel shaped leg member 42 having a web 44, FIG. 5, and opposed flanges 46 and 48, each having a reentrant flange part 46a and 48a, respectively, FIGS. 4 and 5, to leave a large longitudinal slot or opening 50 in the side of the leg member, opposite web 44.

As shown in FIGS. 2 and 3, each of the leg members 42 includes a transverse right angle support bracket 52 secured to the upper end of the leg member for supporting a generally cylindrical hinge pin 54, as shown in FIGS. 2 and 3. The leg members 42 are supported for pivotal movement on and with respect to the ramp 28 by spaced apart hinge brackets 56 engageable with the pins 54 and which depend from and are secured to spaced apart gussets 31 forming part of the frame of the ramp 28. The channel shaped leg members 42 may pivot with respect to the ramp 28 between a cross traffic support position shown in FIGS. 2 and 3 and a somewhat inclined or retracted position when rotated clockwise, viewing FIG. 2. Each of the cross traffic leg 38 and 40 is operable to be supported on a pedestal 23 and 25, respectively, see FIG. 1, comprising parts of frame 20. Each of the pedestals 23 and 25 includes a sloping guide surface 23a and 25a, see FIGS. 2 and 3, also.

The cross traffic legs 38 and 40 each also include an elongated, generally rectangular cross section leg member 60 which is slidably disposed in telescoping relationship within the leg members 42, respectively. The leg members 60, each include a stop part 62 projecting from one planar side 60a of the leg member, see FIGS. 2 and 5 in particular. Stop part 62 is engageable with a retainer part 43, FIGS. 2 and 4, which bridges over the slot or opening 50 between the reentrant flange parts 46a and 48a. Accordingly, the telescoping leg members 60 are adapted for slidable relationship within the leg members 42 but are retained from dropping out of the lower ends of the leg members 42 by cooperation between the parts 62 and 43.

Each of the cross traffic legs 38 and 40 also includes a lock member 64, see FIGS. 1 and 2, which is preferably of a rectangular cross section but of reduced width so that the lock members may be moved into and out of engagement with respective ones of the leg members 60. As shown in FIG. 4 by way of example, each of the lock members 64 includes a transverse, cylindrical tubular pivot or hinge member 66 suitably secured to a top edge 64a of the lock member, which pivot member is supported on a cylindrical pivot pin 68 extending between and suitably secured to the flanges 46 and 48, as by welding, for example, see FIGS. 4 and 5. Accordingly, the lock members 64 may be pivoted from the retracted working position shown by the solid lines in FIG. 2, by way of example, to a position substantially out of the leg members 42, respectively, so that the leg members 60 may move up into the leg members 42, respectively, as needed, to allow the ramp 28 to move to a selected below dock position with respect to the dock surface 12.

Each of the lock members 64 is operably connected to the lip 33 by suitable linkage, preferably a flexible cable 70, see FIGS. 1 and 2. Each of the cables 70 is suitably secured at its opposite ends to the lip 33 and to a lower portion of the lock members 64 so that, as shown in FIG. 2, when the lip 33 is moved from a pendant position to an extended position the lock members 64 are retracted out of possible engagement with the leg members 60 and the leg members 60 may move upward, viewing FIG. 2, within the leg members 42 to allow movement of the ramp 28 downward viewing FIG. 2, to a below dock position for suitable engagement with a vehicle loadbed, as needed. Accordingly, when the ramp 28 is actuated to move to an inclined position, such as shown in FIG. 1, and the lip 33 moves from its pendant position to its extended position, the lock members 64 are moved out of possible locking engagement with the leg members 60. However, when the dock leveler 18 is moved to its stored position to allow cross traffic over the deck 30, or otherwise whenever the lip 33 is moved from its extended position to its pendant position, the lock members 64 are allowed to pivot back into the positions as shown in FIGS. 2 and 3, to engage the leg members 60 to thereby support the ramp 28 in its cross traffic position. In the drawing figures a slight amount of space is shown between the lock members 64 and upper transverse surfaces 60b of the leg members 60 for purposes of illustration. However, when the weight of ramp 28 is bearing on leg members 42, by way of frame plate 39 and through hinge pins 54, lock members 64 are forcibly engaged with surfaces 60b, respectively.

Referring further to FIGS. 2 and 3, the cross traffic leg 38 is further provided with a retainer or lock mechanism to prevent substantial unwanted movement of the lip 33 from its pendant position to its inclined position and which would be sufficient to allow access to the underside of the dock leveler ramp 28 and the pit 16. Accordingly, when the ramp 28 is in the stored position shown in FIGS. 2 and 3, persons may not access the inside of a building at which the dock leveler 18 is disposed by raising the lip 33 and then raising the ramp 28. This action is prevented from exterior of the dock leveler 18 by a so-called night lock comprising a retainer pin 74 which is mounted on the cross traffic leg 38, as shown in FIGS. 2 and 3, for limited vertical sliding movement with respect to the leg member. 42 by spaced apart support brackets 76 and 78. Brackets 76 and 78 include coaxial pin receiving bores therein and are secured to the web 44 of the leg member 42, as shown in FIGS. 2 and 3. A transverse stop pin 75 is mounted on the retainer pin 74 to limit travel of the pin 74 vertically, viewing FIG. 2, between the brackets 76 and 78. An eyebolt 80 is secured to the lock member 64, projects through a window 44a in web 44, FIGS. 2 and 3, and is operable to receive the pin 74 therewithin.

Accordingly, when the dock leveler 18 is moved to the stored position shown in FIGS. 2 and 3, the lip 33 moves to its pendant position allowing the lock members 64 to move to the positions shown. However, when the ramp 28 is still somewhat elevated, the pin 74 has dropped downward, viewing FIG. 2, until the stop pin 75 engages the bracket 78 to allow the upper end of the pin 74 to clear the eyebolt 80 as the lock members 64 move into their positions within the leg members 42. Then, as the ramp 28 is moved downward toward its cross traffic position, the pin 74 will project through the eyebolt 80 to substantially lock the member 64 of cross traffic leg 38 in the position shown. In this way, if an attempt is made to gain access to the underside of the ramp 28 by raising the lip 33 from the exterior of the loading dock 10, such action will be substantially prevented and the lip 33 may not be raised sufficiently to allow access to the underside of the ramp 28 to release holddown mechanism 32a, for example, so that the dock leveler ramp could be raised and a person could gain access to the dock surface 12 from under the ramp 28. Accordingly, as the ramp 28 is lowered to the cross traffic position with lip 33 in its pendant position, the pin 74 will engage the pedestal 23 and project up through the eyebolt 80 to assume the position shown in FIG. 2 to thereby retain the lock member 64 in the position shown. The retainer or lock pin 74 also prevents unwanted raising of the lip 33 and removal of the lock members 64 from their working positions which could result in unwanted dropping of the dock leveler ramp 28 to a below dock position, should sufficient downward force be exerted thereon.

In certain instances it may be necessary to lower the ramp 28 to a substantial below dock position which would require pivoting the cross traffic legs 38 and 40 substantially in a clockwise direction, viewing FIG. 2, to provide clearance sufficient to lower the ramp 28 downward toward the frame member 22. In such instances, the legs 38 and 40 may be pivoted substantially up under the ramp 28 by suitable lanyards 88, see FIGS. 1 and 2, which are connected, respectively, to the leg members 42 of the cross traffic legs 38 and 40 and are trained upward to suitable receptacles 30b formed in the deck 30. Accordingly, operating personnel may grasp respective operating handles 88a of the lanyards 88, one shown in FIG. 2, and manually pivot the legs 38 and 40 to a position such that the ramp 28 may be lowered. Guide surfaces 23a and 25a are positioned to engage the leg members 60 and 42 of the legs 38 and 40 under such conditions to allow the leg members to be guided sufficiently out of a position wherein they would forcibly engage bottom wall 16a of the pit 16.

The construction and operation of the dock leveler 18, particularly with regard to the cross traffic legs 38 and 40, is believed to be understandable to those of skill in the art from the foregoing description. However, briefly, when the ramp 28 is to be placed in a working position above the dock surface 12, the holddown mechanism 32a is released and the ramp allowed to move upwardly to the position shown in FIG. 1, for example. As the ramp 28 moves upwardly, the retainer pin 74 moves downwardly until the stop pin 75 engages bracket 78 which places the pin 74 out of engagement with the eyebolt 80. Accordingly, as the lip 33 is moved from its pendant position to its inclined or extended position, the lock members 64 are moved out of positions of engagement with the leg members 60. In other words, the lock members 64 are moved to the positions shown by the solid lines in FIG. 1 and the alternate position lines in FIG. 2. As long as the lip 33 is in its extended position the leg members 60 may move upward in the leg members 42 so that the ramp 28 may be moved downward to a selected below dock position, if needed. As previously discussed if the ramp 28 is required to be moved to a substantial below dock position the lanyards 88 may be actuated to retract the legs 38 and 40 substantially further up under the ramp 28 by pivoting the leg members 38 and 40 about the respective hinge pins 54.

When it is desired to return the ramp 28 to the cross traffic position the ramp may be moved to a position slightly above the cross traffic position and the lip 33 allowed to drop to its pendant position, at which time the lock members 64 will move into their working positions within the leg members 42 so that, upon resting the ramp 28 at the cross traffic position with deck 30 substantially coplanar with the dock surface 12, the lock members 64 will engage the leg members 60 to support the ramp 28 in the cross traffic position. As the ramp 28 is lowered to the cross traffic position pin 74 will also move into engagement with eyebolt 80 of leg 38.

The construction of the dock leveler 18 and the cross traffic legs 38 and 40 may be carried out using conventional engineering materials and manufacturing practices known to those of skill in the art of dock levelers and similar equipment. Although a preferred embodiment of the invention has been described in detail herein those skilled in the art will further recognize that various substitutions and modifications may be made without departing from the scope and spirit of the appended claims.

What is claimed is:

1. In a dock leveler including a ramp supported for movement between a working position and a cross traffic position at a loading dock, a cross traffic leg mounted on said ramp for supporting said ramp in said cross traffic position, said cross traffic leg including a first leg member supported on said ramp for pivotal movement with respect to said ramp, a second leg member supported on said first leg member for limited movement with respect to said first leg member and a lock member disposed on said first leg member and moveable between a position in engagement with said second leg member to support said ramp in said cross traffic position and a position to allow movement of said second leg member with respect to said first leg member whereby said ramp may be moved between said cross traffic position and a working position.

2. The invention set forth in claim 1 including:
   a retainer engageable with said lock member when said lock member is in a position for engagement with said second leg member to prevent movement of said lock member out of engagement with said second leg member.

3. The invention set forth in claim 1 wherein:

said ramp includes spaced apart cross traffic legs, each of said cross traffic legs including a first leg member mounted for pivotal movement on and with respect to said ramp, a second leg member supported on said first leg member for limited movement with respect to said first leg member and a lock member associated with each of said cross traffic legs for engagement with said second leg member to support said ramp in said cross traffic position.

4. The invention set forth in claim 1 wherein:

said first leg member comprises a generally rectangular cross section channel member including reentrant flange parts for retaining said second leg member slidably within said first leg member and cooperating stop members on said second leg member and said first leg member to limit telescoping movement of said leg members with respect to each other.

5. The invention set forth in claim 1 wherein:

said lock member includes a pivot pin connected thereto and supported on said first leg member to provide for pivotal movement of said lock member with respect to said first leg member.

6. The invention set forth in claim 1 including:

means for pivoting said first leg member to a substantially retracted position under said ramp to allow substantial downward movement of said ramp below a surface of said loading dock.

7. In a dock leveler including a ramp supported for movement between a working position and a cross traffic position at a loading dock, a pair of spaced apart cross traffic legs mounted on said ramp for supporting said ramp in said cross traffic position, each of said cross traffic legs including a first leg member supported on said ramp for pivotal movement with respect to said ramp, a second leg member supported on said first leg member for limited telescoping movement with respect to said first leg member, a lock member supported for pivotal movement on said first leg member and moveable between a position in engagement with said second leg member to support said ramp in said cross traffic position and a position out of engagement with said second leg member to allow said ramp to be moved between said cross traffic position and a working position, said first leg member comprising a generally rectangular cross section channel member including reentrant flange parts for retaining said second leg member slidably within said first leg member and cooperating stop members on said second leg member and said first leg member to limit telescoping movement of said leg members with respect to each other.

8. The invention set forth in claim 7 wherein:

said lock member includes a pivot member connected thereto and supported on said first leg member to provide for pivotal movement of said lock member with respect to said first leg member.

9. The invention set forth in claim 7 including:

means for pivoting said first leg member to a substantially retracted position under said ramp to allow substantial downward movement of said ramp below a surface of said loading dock.

10. In a dock leveler including a ramp supported for movement between a working position and a cross traffic position at a loading dock, a cross traffic leg mounted on said ramp for supporting said ramp in said cross traffic position, said cross traffic leg including a first leg member supported on said ramp for pivotal movement with respect to said ramp, a second leg member supported on said first leg member for limited telescoping movement with respect to said first leg member and a lock member supported for pivotal movement on said first leg member and moveable between a position for engagement with said second leg member to support said ramp in said cross traffic position and a position out of engagement with said second leg member to allow said ramp to be moved between said cross traffic position and a working position.

11. In a dock leveler including a ramp supported for movement between a working position and a cross traffic position at a loading dock, a cross traffic leg mounted on said ramp for supporting said ramp in said cross traffic position, said cross traffic leg including a first leg member supported on said ramp for pivotal movement with respect to said ramp, a second leg member supported on said first leg member for limited telescoping movement with respect to said first leg member, a lock member moveable between a position in engagement with said second leg member to support said ramp in said cross traffic position and a position out of engagement with said second leg member to allow said ramp to be moved between said cross traffic position and a working position, a retainer pin engageable with said lock member when said lock member is in a position for engagement with said second leg member to prevent movement of said lock member out of engagement with said second leg member, said retainer pin is supported on said first leg member for limited movement in response to movement of said ramp to an inclined position with respect to said loading dock, and a retainer pin engaging part on said lock member engageable with said retainer pin when said ramp is moved to a cross traffic position to prevent movement of said lock member out of engagement with said second leg member.

12. In a dock leveler including a ramp supported for movement between a working position and a cross traffic position at a loading dock, a pair of cross traffic legs mounted on said ramp for supporting said ramp in said cross traffic position, each of said cross traffic legs including a first leg member supported on said ramp for pivotal movement with respect to said ramp, a second leg member supported on said first leg member for limited telescoping movement with respect to said first leg member and a lock member supported for pivotal movement on said first leg member and moveable between a position in engagement with said second leg member to support said ramp in said cross traffic position and a position out of engagement with said second leg member to allow said ramp to be moved between said cross traffic position and a working position, said lock member is operably connected to an extension lip member mounted on said ramp and is responsive to movement of said lip member between a pendant position and an extended position to move from a working position for engagement with said second leg member to said position out of engagement with said second leg member.

13. The invention set forth in claim 12 including:

a flexible link interconnecting said lock member with said lip for moving said lock member out of said working position in response to movement of said lip member to said extended position.

14. The invention set forth in claim 13 wherein:

said link comprises a flexible cable.

15. The invention set forth in claim 12 including:

a retainer engageable with one of said lock members when said one lock member is in a position for engagement with one of said second leg members to prevent movement of said one lock member out of engagement with said one of said second leg members.

16. The invention set forth in claim 15 wherein:

said retainer comprises a pin supported on one of said first leg members for limited movement in response to movement of said ramp to an inclined position with respect to said loading dock and a pin engaging part disposed on said one lock member engageable with said pin when said ramp is moved to a cross traffic position to prevent movement of said one lock member out of engagement with said one of said second leg members.

17. In a dock leveler including a ramp supported for movement between a working position and a cross traffic position at a loading dock, a cross traffic leg mounted on said ramp for supporting said ramp in said cross traffic position, said cross traffic leg including a first leg member supported on said ramp for pivotal movement with respect to said ramp, a second leg member supported on said first leg member for limited telescoping movement with respect to said first leg member and a lock member moveable between a position in engagement with said second leg member to support said ramp in said cross traffic position and a position out of engagement with said second leg member to allow said ramp to be moved between said cross traffic position and a working position, said lock member is operably connected to a lip member mounted on said ramp and is responsive to movement of said lip member between a pendant position and an extended position to move from a working position for engagement with said second leg member to a position out of engagement with said second leg member.

18. The invention set forth in claim 17 including:

a link interconnecting said lock member with said lip for moving said lock member out of said working position in response to movement of said lip member to said extended position.

19. The invention set forth in claim 18 wherein:

said link comprises a flexible cable.

* * * * *